United States Patent Office 2,749,489
Patented June 5, 1956

2,749,489

DRY CONTACT RECTIFIERS

Simon Ernst Mayer and Ronald Alfred Hill, London, England, assignors to International Standard Electric Corporation, New York, N. Y.

No Drawing. Application December 4, 1950, Serial No. 199,138

20 Claims. (Cl. 317—238)

This invention relates to alternating current rectifiers of the dry contact type and to methods of making them.

It is known that the oxides of some metals behave as semi-conductors, that is to say, the electrical conductivity of the oxide increases with increase of temperature and that the oxides of some other metals behave in the same way as a metal, that is to say, the electrical conductivity of the oxide decreases with increase of temperature. Oxides of metals in the semi-conductor class include such oxides as titanium dioxide, nickel oxide and zinc oxide and oxides of metals in the metallically conducting class include such oxides as lead dioxide, ferroso-ferric-oxide, manganese dioxide and thallic oxide.

Oxides of metals in the metallically conducting class may be further distinguished as comprising oxides which go to the anode in electrolysis.

According to the invention an alternating current rectifier of the dry contact type comprises a disc or plate consisting of consolidated semi-conducting metal oxide in intimate contact with a metallically conducting oxide.

A semi-conducting metal oxide may be consolidated by pressing or pressing and sintering the oxide in powdered form, with or without suitable admixtures and/or temporary binding agents.

Other methods of consolidating the semi-conducting metal oxide may, however, be employed.

In one form of construction of rectifiers according to the invention, we have employed as the semi-conductor layer, thin flat discs of sintered titanium dioxide to one side of which a flat disc of lead dioxide or thallic oxide is applied and retained in position by clamping. Electrical contact with the outer surfaces of the two discs of each rectifier was made by means of colloidal graphite, deposited thereon in known manner. As will be obvious it was necessary to take simple precautions to prevent the rectifiers being short circuited by the clamps.

In order to form a disc of titanium dioxide, titanium dioxide is powdered and mixed if desired with about 10% of lead borate. The powder, either dry or formed into a paste for instance with water, is then pressed into the form of a disc and, after drying if paste is used, is fired in a neutral atmosphere such as hydrogen at about 1300° C. for one hour. It has been found advantageous to re-oxidise the surface of the titanium dioxide disc by heating in air for a few minutes at 500° C.

The disc of lead dioxide or thallic oxide was formed by pressing lead dioxide or thallic oxide in powdered form in a mould.

In another form of construction of rectifiers according to the invention, the counter-electrode layer was applied to the surface of the sintered titanium oxide disc through a volatile carrier medium in which lead dioxide or thallic oxide in powdered form was mixed in suspension. In one case the carrier medium comprised lacquer which, after drying, retained the counter-electrode in position without the need for clamping means.

The electrical properties of a rectifier made as described above can be summarised as follows:

LEAD DIOXIDE COUNTERELECTRODE

| A. C. Volts applied | D. C. Volts output | Current, ma./cm.² |
|---|---|---|
| 40 | 25 | 10 |
| 35 | 20 | 25 |
| 30 | 10 | 40 |
| 20 | 4 | 50 |

THALLIC OXIDE COUNTER-ELECTRODE

| 10 | 3.7 | 46 |
| 10 | 3.4 | 140 |
| 10 | 2.3 | 280 | in making the above tests the rectifiers were arranged in full wave bridge connections.

It is to be understood that, although a rectifier having a semi-conductor layer comprising a single oxide of metal and a counter-electrode layer having a single oxide of metal, has been described, the invention includes rectifiers having a semi-conductor layer comprising two or more semi-conducting oxides of metals and/or a counter-electrode comprising two or more conducting oxides of metals.

While the principles of the invention have been described above in connection with specific embodiments, and particular modifications thereof, it is to be clearly understood that this description is made only by way of example and not as a limitation on the scope of the invention.

What we claim is:

1. A dry contact rectifier consisting solely of two layers: a base plate consisting of a consolidated powder of one or more semi-conducting metallic oxides, and a layer of one or more conducting metallic oxides in intimate mechanical and electrical contact with one surface of said plate.

2. Rectifier according to claim 1, in which the semi-conducting metallic oxide is nickel oxide.

3. Rectifier according to claim 1, in which the semi-conducting metallic oxide is zinc oxide.

4. Rectifier according to claim 1, in which the semi-conducting metallic oxide is titanium dioxide.

5. Rectifier according to claim 1, in which the semi-conducting metallic oxide is nickel oxide in combination with approximately 10% lead borate added thereto.

6. Rectifier according to claim 1, in which the semi-conducting metallic oxide is zinc oxide in combination with approximately 10% lead borate added thereto.

7. Rectifier according to claim 1, in which the semi-conducting metallic oxide is titanium dioxide in combination with approximately 10% lead borate added thereto.

8. Rectifier according to claim 1, in which said conducting metallic oxide layer is in the form of a disc of compressed conducting metallic oxide powder, in combination with means clamping said disc to said plate.

9. Rectifier according to claim 8, in which the conducting metallic oxide is lead dioxide.

10. Rectifier according to claim 8, in which the conducting metallic oxide is thallic oxide.

11. Rectifier according to claim 8, in which the conducting metallic oxide is a mixture of lead dioxide and thallic oxide.

12. Rectifier according to claim 1, in which the conducting metallic oxide is lead dioxide.

13. Rectifier according to claim 1, in which the conducting metallic oxide is thallic oxide.

14. Rectifier according to claim 1, in which the conducting metallic oxide is a mixture of lead dioxide and thallic oxide.

15. The method of making a dry contact rectifier consisting of only two layers which comprises forming a base plate by consolidating one or more powdered semi-conducting oxides, and applying solely one additional layer consisting of one or more conducting metallic oxides in intimate electrical and mechanical contact with one surface of said plate.

16. Method according to claim 15, in which said base plate is formed by adding water to the semi-conducting metallic oxides in such amount as to form a paste, pressing said paste into the desired shape of the plate, drying the shaped plate, and firing the same in a neutral atmosphere for approximately one hour at approximately 1300° C.

17. Method according to claim 16, which includes the further step of re-oxidizing the surface of the plate by heating the same in air for several minutes at approximately 500° C.

18. Method according to claim 15, which includes the steps of forming said layer of conducting metallic oxides as a separate body by pressing powdered conducting metallic oxides in a mold, and then clamping said separate body to said base plate.

19. Method according to claim 15, in which said layer of conducting metallic oxides is applied by mixing the conducting metallic oxides in a volatile carrier, applying the carrier mixture to one surface of the base plate, and then drying the rectifier.

20. A method according to claim 15, in which said base plate is formed by adding water to the semi-conducting metallic oxides in such amount as to form a paste, pressing said paste into the desired shape of the plate, drying the shaped plate, and firing the same in a neutral atmosphere for approximately one hour at approximately 1300° C., and in which said layer of conducting metallic oxides is applied by mixing the conducting metallic oxides in a volatile carrier, applying the carrier mixture to one surface of the base plate, and then drying the rectifier.

References Cited in the file of this patent

UNITED STATES PATENTS

| 929,582 | Garretson | July 27, 1909 |
| 1,741,291 | Friederich et al. | Dec. 31, 1929 |
| 1,748,012 | Dooley | Feb. 18, 1930 |
| 1,776,217 | Dooley | Sept. 16, 1930 |
| 1,796,372 | Jamison | Mar. 17, 1931 |
| 1,985,118 | Van Geel et al. | Dec. 18, 1934 |
| 2,267,954 | Schumacher | Dec. 30, 1941 |
| 2,462,906 | Sauerborn | Mar. 1, 1949 |
| 2,465,768 | Van Geel et al. | Mar. 29, 1949 |

FOREIGN PATENTS

| 247,861 | Switzerland | Jan. 3, 1948 |